United States Patent
Kwon et al.

(10) Patent No.: US 11,556,215 B2
(45) Date of Patent: Jan. 17, 2023

(54) TOUCH SENSOR

(71) Applicant: DONGWOO FINE-CHEM CO., LTD., Iksan-si (KR)

(72) Inventors: Dohyoung Kwon, Osan-si (KR); Cheol Hun Lee, Pyeongtaek-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 17/672,161

(22) Filed: Feb. 15, 2022

(65) Prior Publication Data

US 2022/0261114 A1  Aug. 18, 2022

(30) Foreign Application Priority Data

Feb. 18, 2021 (KR) .................. 10-2021-0021753

(51) Int. Cl.
*G06F 3/044* (2006.01)

(52) U.S. Cl.
CPC .......... *G06F 3/0443* (2019.05); *G06F 3/0446* (2019.05); *G06F 2203/04112* (2013.01)

(58) Field of Classification Search
CPC .. G06F 3/0443; G06F 3/0446; G06F 3/04112; G06F 3/0445; G06F 3/041; G06F 3/044; G06F 2203/04111; G06F 2203/04112
See application file for complete search history.

(56) References Cited

U.S. PATENT DOCUMENTS

| 10,037,109 | B2 * | 7/2018 | Yashiro | G06F 3/0445 |
| 10,095,339 | B1 * | 10/2018 | Tsai | G06F 3/0412 |
| 2011/0210935 | A1 * | 9/2011 | Chuang | G06F 3/0445 345/174 |
| 2011/0290631 | A1 * | 12/2011 | Kuriki | G06F 3/0446 200/600 |
| 2014/0332262 | A1 * | 11/2014 | Yoshiki | G06F 3/0445 174/264 |
| 2016/0103517 | A1 * | 4/2016 | Kang | G06F 3/0412 345/174 |

(Continued)

FOREIGN PATENT DOCUMENTS

| KR | 10-2014-0051649 A | 5/2014 |
| KR | 10-1952770 B1 | 2/2019 |
| KR | 10-2020-0032445 A | 3/2020 |

*Primary Examiner* — Darlene M Ritchie
(74) *Attorney, Agent, or Firm* — Sughrue Mion, PLLC

(57) ABSTRACT

A touch sensor comprises a first electrode layer, a second electrode layer, and an insulation layer. The first electrode layer includes first main electrode cells connected and arranged in a first direction and second auxiliary electrode cells separated from the first main electrode cells and arranged separately in a second direction on the same lower plane. The second electrode layer includes first auxiliary electrode cells arranged separately in the first direction and stacked and connected to the first main electrode cells while having the same pattern as the first main electrode cells and second main electrode cells separated from the first auxiliary electrode cells, connected and arranged in a second direction, and stacked and connected to the second auxiliary electrode cells while having the same pattern as the second auxiliary electrode cells, on the same upper plane. The insulation layer is formed between the first electrode layer and the second electrode layer.

10 Claims, 3 Drawing Sheets

(56) References Cited

U.S. PATENT DOCUMENTS

| | | | | |
|---|---|---|---|---|
| 2017/0147132 A1* | 5/2017 | Choi | ................... | G06F 3/0446 |
| 2018/0018034 A1* | 1/2018 | Choi | ................... | G06F 3/0446 |
| 2020/0089372 A1* | 3/2020 | Park | ................... | G06F 3/0448 |
| 2020/0303467 A1* | 9/2020 | Feng | ................... | H01L 27/323 |
| 2022/0334678 A1* | 10/2022 | Long | ................... | G06F 3/0443 |

* cited by examiner

[Figure 1]
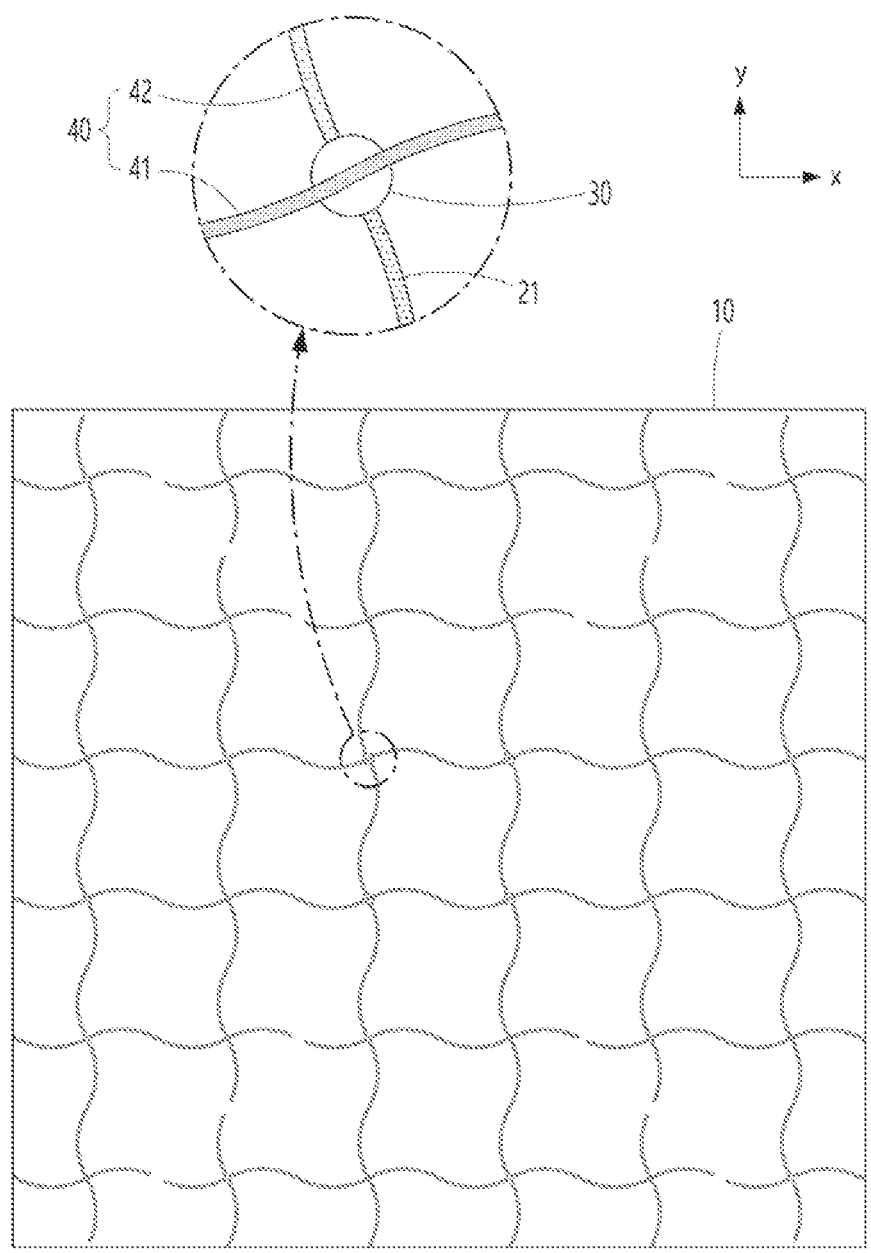

[Figure 2]
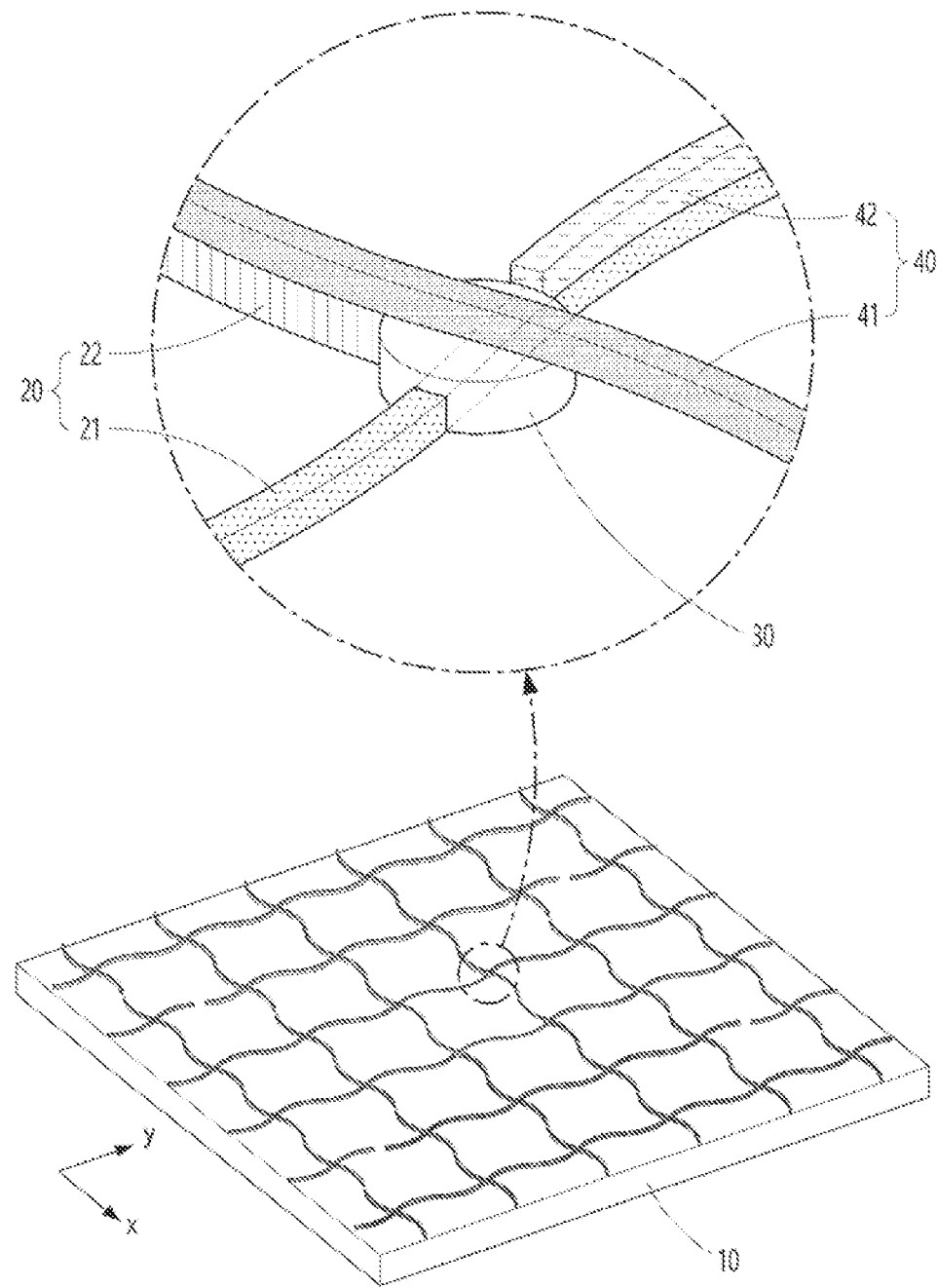

[Figure 3]
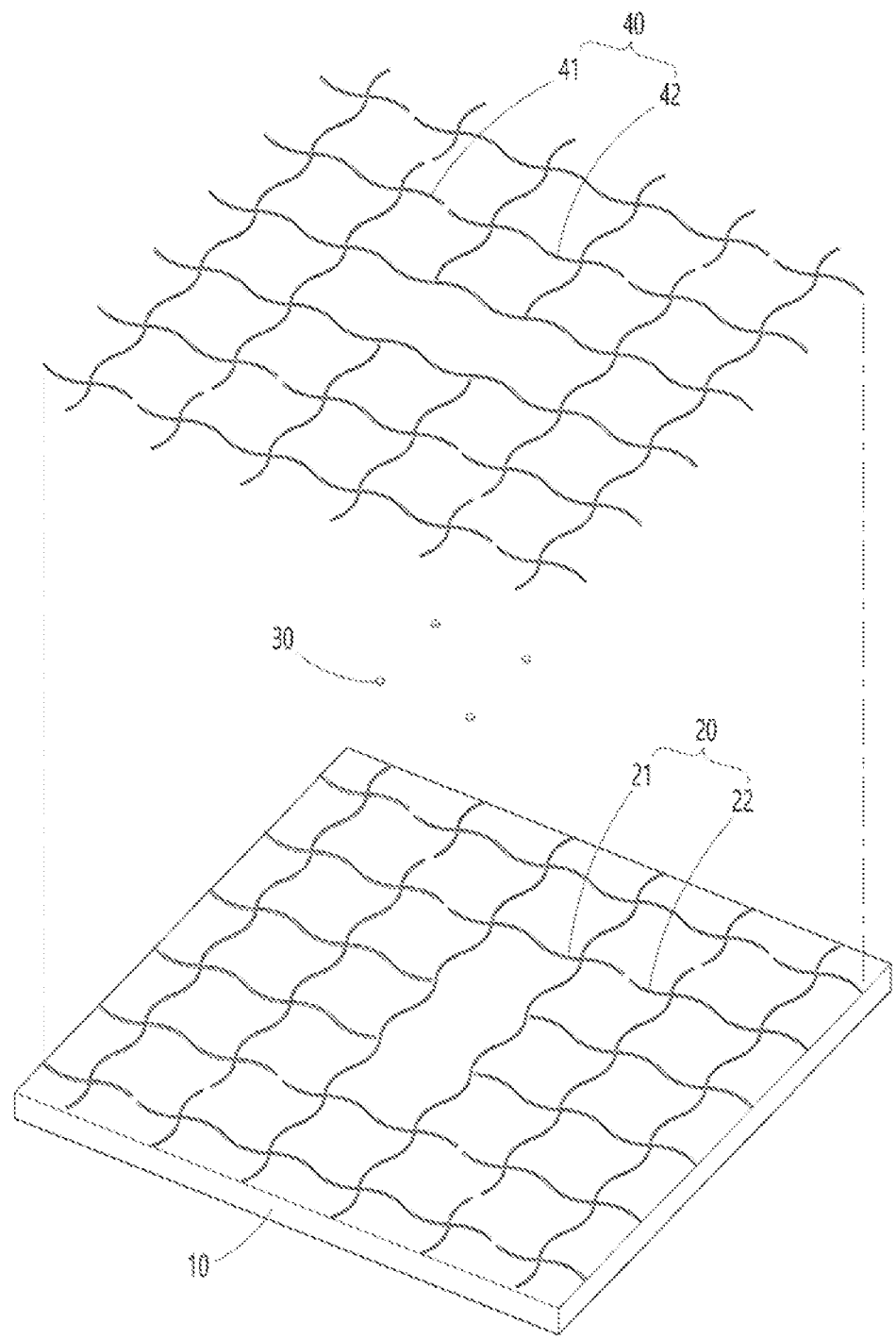

TOUCH SENSOR

CROSS REFERENCE TO RELATED APPLICATIONS

This application claims priority based on Korean Patent Application No. 10-2021-0021753, filed Feb. 18, 2021, the entire content of which is incorporated herein by reference in its entirety.

TECHNICAL FIELD

The present invention relates to a touch sensor. Particularly, the present invention relates to a touch sensor that increases transmittance and aperture ratio while lowering resistance, lowers pattern visibility, and does not require a bridge.

BACKGROUND ART

A touch sensor includes an electrode layer for sensing a user's touch operation. The electrode layer includes a plurality of electrode cells arranged to cross each other and be spaced apart. The electrode layer is divided into an electrode cell region in which the electrode cell exists and an inter-cell region in which the electrode cell does not exist.

The electrode cell region and the inter-cell region may have different optical properties such as transmittance and reflectance. As a result, the electrode cell region and the inter-cell region are distinguished, which causes a problem of being recognized by a user.

In order to solve this problem, Korean Patent Publication No. 10-2014-0051649 (Metal mesh type touch screen panel) proposes to form the electrode layer with a metal mesh. Korean Patent Registration No. 10-1952770 prevents or minimizes visibility of the electrode cell region and the inter-cell region by forming a fine pattern on the transparent oxide electrode cell.

In the prior art, however, a bridge is visually recognized when the electrode layer is formed of a metal mesh and the electrode cells are connected by a bridge. In addition, when the electrode (metal mesh) area is increased to lower the resistance, the aperture ratio and transmittance may decrease. As such, it is difficult to simultaneously achieve reduction in resistance and improvement in aperture ratio/transmittance in the prior art.

DISCLOSURE OF INVENTION

Technical Problem

An object of the present invention is to lower the resistance based on the same aperture ratio.

Another object of the present invention is to increase the aperture ratio (or transmittance) based on the same resistance.

Yet another object of the present invention is to improve visibility.

Still another object of the present invention is to solve the problem that the bridge is visually recognized by not using the bridge.

Technical Solution

A touch sensor of the present invention for achieving this purpose may comprise a first electrode layer, a second electrode layer, an insulation layer, and so on.

The first electrode layer may include first main electrode cells and second auxiliary electrode cells formed on the same lower plane.

The first main electrode cells may be connected and arranged in a first direction.

The second auxiliary electrode cells may be arranged separately in a second direction and may also be separated from the first main electrode cells.

The second electrode layer may include first auxiliary electrode cells and second main electrode cells formed on the same upper plane.

The first auxiliary electrode cells may be arranged separately in the first direction which is the arrangement direction of the first main electrode cells, and stacked on the first main electrode cells while having the same pattern as the first main electrode cells and connected vertically.

The second main electrode cells may be connected and arranged in the same second direction as the arrangement direction of the second auxiliary electrode cells, and stacked on the second auxiliary electrode cells while having the same pattern as the second auxiliary electrode cells and connected vertically. The second main electrode cells may also be separated from the first auxiliary electrode cells.

The insulation layer may be formed between the first electrode layer and the second electrode layer.

In the touch sensor of the present invention, the insulation layer may be formed in an intersection area of the first main electrode cells and the second main electrode cells.

In the touch sensor of the present invention, the first and second main electrode cells and the first and second auxiliary electrode cells may have a mesh pattern.

In the touch sensor of the present invention, the insulation layer may exist in a form of an island in the intersection area of the first main electrode cells and the second main electrode cells. The insulation layer may include 1 to 9 insulation pads vertically insulating the intersection area of the first main electrode cells and the second main electrode cells.

In the touch sensor of the present invention, the insulation layer may include 4 insulation pads.

In the touch sensor of the present invention, the mesh pattern may be composed of a metal.

In the touch sensor of the present invention, insulation pad may have a same width as a line width of the mesh pattern of the first and second main electrode cells.

In the touch sensor of the present invention, the insulation pad may have a larger width than a line width of the mesh pattern of the first and second main electrode cells.

In the touch sensor of the present invention, the mesh pattern may have a line width of 2 to 7 μμm.

In the touch sensor of the present invention, the mesh pattern may have a pitch of 150 to 450 μm.

Advantageous Effects

According to the present invention having such a configuration, a first electrode layer having first main electrode cells and second auxiliary electrode cells and a second electrode layer having second main electrode cells and first auxiliary electrode cells are stacked and connected up and down, and the electrode cells are configured in a mesh pattern. Through this, the present invention can lower the resistance at the same aperture ratio and increase the aperture ratio (or transmittance) at the same resistance.

In the present invention, the insulation of the first electrode layer and the second electrode layer is achieved by an insulation pad arranged in an island shape, and further, the insulation pad is formed close to the line width of the metal mesh, ideally the same. Through this, the present invention can block or minimize the visibility of the insulation layer.

Moreover, the present invention takes a configuration without a bridge. Through this, the present invention can fundamentally solve the problem of the bridge being recognized.

DESCRIPTION OF DRAWINGS

FIG. 1 is a combined plan view of a touch sensor according to the present invention.

FIG. 2 is a combined perspective view of the touch sensor according to the present invention.

FIG. 3 is an exploded perspective view of a touch sensor according to the present invention.

BEST MODE

Hereinafter, the present invention will be described in detail with reference to the accompanying drawings.

FIGS. 1 to 3 are a combined plan view, a combined perspective view, and an exploded perspective view of a touch sensor according to the present invention, respectively.

As shown in FIGS. 1 to 3, the touch sensor according to the present invention may include a base layer 10, electrode layers 20 and 40, an insulation layer 30, and so on.

The base layer 10 is a base of the electrode layers 20 and 40, and may be composed of, for example, a cyclo-olefin polymer (COP), polycarbonate, polyethylene terephthalate (PET), polymethyl methacrylate, polyimide, polyethylene naphthalate, polyether sulfone, etc.

The base layer 10 may be a separation layer, a protective layer, or a laminate of a separation layer and a protective layer when the touch sensor is manufactured by a transfer method.

The separation layer may be composed of an organic polymer film, for example, polyimide, poly vinyl alcohol, polyamic acid, polyimide, polyethylene, polystyrene, polynorbornene, etc.

The protective layer may include at least one of an organic insulation layer or an inorganic insulation layer, and it can be formed through coating/curing or deposition.

The electrode layers 20 and 40 may include a plurality of electrode cells 21, 22, 41 and 42 that are regularly arranged and connected, for example, horizontally (X-axis in FIGS. 1 to 3) and vertically (Y-axis in FIGS. 1 to 3) on the base layer 10. The electrode cells 21, 22, 41, and 42 may have various planar shapes, such as a triangle, a quadrangle, a rhombus, a pentagon, a hexagon, or the like.

The electrode layers 20 and 40 may be composed of a conductive metal. The conductive metal may be, for example, gold (Au), silver (Ag), copper (Cu), molybdenum (Mo), nickel (Ni), chromium (Cr), aluminum (Al), silver-palladium-copper alloy (APC), etc. The electrode layers 20 and 40 may consist of a conductive metal alone, or it can also be comprised of laminates, such as a triple layer of nickel-copper layer/copper layer/nickel-copper layer, a triple layer of nickel-copper layer/copper layer/nickel layer, a double layer of nickel-copper layer/copper layer, or a triple layer of black nickel layer/copper layer/black nickel layer.

The electrode layers 20 and 40 may be formed of metal in a mesh pattern. In this case, the electrode layers 20 and 40 may have a two-layer structure, for example, by laminating the first electrode layer 20 and the second electrode layer 40 to further lower the resistance.

As shown in FIGS. 2 and 3, the first electrode layer 20 may be formed on the same lower plane, for example, the base layer 10. The first electrode layer 20 may include first main electrode cells 21 and second auxiliary electrode cells 22.

The first main electrode cells 21 may be arranged while being connected in a first direction (Y-axis direction in FIG. 3). The first main electrode cells 21 may have a conductive metal mesh pattern in a rhombus shape.

The second auxiliary electrode cells 22 may be arranged while being separated in a second direction, for example, in a direction perpendicular to the arrangement of the first main electrode cells 21 (X-axis direction in FIG. 3). The second auxiliary electrode cells 22 may also be physically and electrically separated from the first main electrode cells 21. Like the first main electrode cell 21, the second auxiliary electrode cells 22 may have a conductive metal mesh pattern in a rhombus shape.

The first electrode layer 20 may be formed by, for example, a lithography process, for example, first forming a conductive metal on the base layer 10 and then applying a photoresist, aligning a mask, exposing, developing, and the like.

The insulation layer 30 may be configured to protrude in the direction of the second electrode layer 40 in the intersection area of the first main electrode cells 21 and the second auxiliary electrode cells 22.

The insulation layer 30 may be formed only in the connection area of the first main electrode cell 21. When the first main electrode cell 21 and the second auxiliary electrode cell 22 are configured in a mesh pattern, it may be formed only on the connection pattern (or wiring) of the first main electrode cells 21. At this time, the insulation layer 30 may be configured to be spaced apart in the form of an island. In this case, the insulation layer 30 may be formed as an insulation pad having a planar shape, such as a circular shape or a square shape, which is applied on the connection pattern of the first main electrode cells 21 and closes it up. The insulation pad may be formed only at four points on the connection pattern of the first main electrode cells 21 in the area where the connection area of the first main electrode cells 21 and the connection area of the second auxiliary electrode cells 22 intersect. The four points correspond to the case where two lines intersect. The insulation pad may be formed at one point when one line intersects in the intersection area and at nine points when three lines intersect.

When the insulation layer 30 is configured as an insulation pad in an island shape, the width (or diameter) of the insulation layer 30 is preferably formed to be close to the width of the mesh pattern (wiring) of the electrode layers 20 and 40 to block or minimize the insulation layer 30 being distinguished from the mesh pattern of the electrode layers 20 and 40 and recognized. In order to block the dielectric breakdown of the first main electrode cells 21 and the second main electrode cells 41, it is advantageous to form the width (or diameter) of the insulation layer 30 larger than the width of the mesh pattern. However, even in this case, it may be preferable to form close to the same width.

The second electrode layer 40 is partially insulated with the insulation layer 30 and coupled to the upper portion of the first electrode layer 20. The second electrode layer 40 may include second main electrode cells 41 and first auxiliary electrode cells 42 on the same plane.

The second main electrode cells 41 may be arranged while being connected in the same second direction as the arrangement direction of the second auxiliary electrode cells 22 of the first electrode layer 20. The second main electrode cells 41 may be vertically stacked and connected to the second auxiliary electrode cells 22 to form the same electrode as the second auxiliary electrode cells 22. The second main electrode cells 41 may be configured in the same shape and pattern as the second auxiliary electrode cells 22 except for the area where they are connected.

The second main electrode cells 41 are vertically insulated from the connection area of the first main electrode cells 21 by the insulation layer 30 in the connection area. As a result, the upper and lower stacked assembly of the first main electrode cells 21 and the first auxiliary electrode cells 42 and the upper and lower stacked assembly of the second main electrode cells 41 and the second auxiliary electrode cells 22 may each form an electrode independently.

The first auxiliary electrode cells 42 may be arranged while being separated along the same first direction as the arrangement direction of the first main electrode cells 21 of the first electrode layer 20. The first auxiliary electrode cells 42 be vertically stacked and connected to the first main electrode cells 21 to form the same electrode as the first main electrode cells 21. The first auxiliary electrode cells 42 may have the same shape and pattern as the first main electrode cells 21, except for the separated area.

As described above, the first electrode layer 20 and the second electrode layer 40 have a structure in which they are laminated and connected while being locally insulated. Through this, the touch sensor of the present invention can achieve the effect of lowering the resistance at the same aperture ratio and increasing the aperture ratio (or transmittance) at the same resistance.

In addition, in the touch sensor of the present invention, there is no need to additionally form a bridge for connecting the spaced apart electrode cells in the first electrode layer 20 or the second electrode layer 40. As a result, the present invention can simplify the structure and manufacturing process of the electrode layer, thereby reducing the manufacturing cost. In addition, the present invention can also achieve improved visibility by fundamentally solving the problem that the bridge is visually recognized.

When the electrode layers 20 and 40 are configured in a mesh pattern, the line width may be 2 to 10 μm. When the line width is less than 2 μm, there is a difficulty in the process, and when it exceeds 10 μm, the aperture ratio becomes small and the transmittance may deteriorate. The optimal line width can be made into 2 to 7 μm. The pitch may be in a range of 150 to 450 μm. If the pitch is less than 150 μm, the transmittance may be deteriorated, and if the pitch exceeds 450 μm, the pattern visibility may be deteriorated. The optimal pitch may be 300 μm.

The space in the electrode layers 20 and 40, that is, the space in the first electrode layers 20 and the space in the second electrode layers 40, may be filled with an insulation layer or a passivation layer.

The insulation layer or the passivation layer is to insulate and protect the electrode layers 20 and 40, and may be composed of one or more materials selected from a curable prepolymer, a curable polymer, and a plastic polymer, which are general insulators.

The insulation layer or the passivation layer may be made of a varnish-type material capable of forming a film. The varnish-type material may be polysilicone, such as polydimethylsiloxane (PDMS) or polyorganosiloxane (POS), polyimide, or polyurethane, such as spandex. The varnish-type material is a soft insulation material and can increase the stretchability and dynamic folding capability of the touch panel.

Although particular embodiments of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

| [Description of reference numerals] | |
|---|---|
| 10: base layer | 20: first electrode layer |
| 21: first main electrode cell | 22: second auxiliary electrode cell |
| 30: insulation layer | 40: second electrode layer |
| 41: second main electrode cell | 42: first auxiliary electrode cell |

The invention claimed is:

1. A touch sensor, comprising:
a base layer;
a first electrode layer on the base layer, the first electrode layer including first main electrode cells connected and arranged in a first direction and second auxiliary electrode cells separated from the first main electrode cells and arranged separately in a second direction;
a second electrode layer including first auxiliary electrode cells arranged separately in the first direction and stacked and connected to the first main electrode cells while having the same pattern as the first main electrode cells and second main electrode cells separated from the first auxiliary electrode cells, connected and arranged in a second direction, and stacked and connected to the second auxiliary electrode cells while having the same pattern as the second auxiliary electrode cells; and
an insulation layer between the first electrode layer and the second electrode layer.

2. The touch sensor of claim 1, wherein the insulation layer is formed in an intersection area of the first main electrode cells and the second main electrode cells.

3. The touch sensor of claim 2, wherein the first and second main electrode cells and the first and second auxiliary electrode cells have a mesh pattern.

4. The touch sensor of claim 3, wherein the insulation layer exists in a form of an island in the intersection area of the first main electrode cells and the second main electrode cells, and includes 1 to 9 insulation pads vertically insulating the intersection area of the first main electrode cells and the second main electrode cells.

5. The touch sensor of claim 4, wherein the insulation layer includes 4 insulation pads.

6. The touch sensor of claim 3, wherein the mesh pattern is composed of a metal.

7. The touch sensor of claim 4, wherein the insulation pad has a same width as a line width of the mesh pattern of the first and second main electrode cells.

8. The touch sensor of claim 4, wherein the insulation pad has a larger width than a line width of the mesh pattern of the first and second main electrode cells.

9. The touch sensor of claim 4, wherein the mesh pattern has a line width of 2 to 7 μm.

10. The touch sensor of claim 4, wherein the mesh pattern has a pitch of 150 to 450 μm.

* * * * *